United States Patent
Huang et al.

(10) Patent No.: US 10,281,650 B2
(45) Date of Patent: May 7, 2019

(54) OPTICAL COMB FILTER HAVING FIRST, SECOND AND THIRD GT RESONANT CAVITIES

(71) Applicant: O-NET COMMUNICATIONS (SHENZHEN) LIMITED, Shenzhen, Guangdong (CN)

(72) Inventors: Shuliang Huang, Guangdong (CN); Yimin Hua, Guangdong (CN); Liancheng Li, Guangdong (CN)

(73) Assignee: O-NET COMMUNICATIONS (SHENZHEN) LIMITED, Shenzhen (CN)

( * ) Notice: Subject to any disclaimer, the term of this patent is extended or adjusted under 35 U.S.C. 154(b) by 104 days.

(21) Appl. No.: 15/303,524

(22) PCT Filed: Mar. 16, 2015

(86) PCT No.: PCT/CN2015/074287
§ 371 (c)(1),
(2) Date: Oct. 11, 2016

(87) PCT Pub. No.: WO2016/101416
PCT Pub. Date: Jun. 30, 2016

(65) Prior Publication Data
US 2017/0038535 A1    Feb. 9, 2017

(30) Foreign Application Priority Data
Dec. 26, 2014    (CN) .......................... 2014 1 0828912

(51) Int. Cl.
*G02B 1/11* (2015.01)
*G02B 5/28* (2006.01)
(Continued)

(52) U.S. Cl.
CPC ......... *G02B 6/29358* (2013.01); *G02B 5/288* (2013.01); *G02B 6/293* (2013.01);
(Continued)

(58) Field of Classification Search
CPC ...... G01B 9/02008; G02B 1/11; G02B 5/284; G02B 5/285–5/288; G02B 6/293;
(Continued)

(56) References Cited

U.S. PATENT DOCUMENTS 6,552,856 B1 *   4/2003   Chen .................... H04B 10/572
                                                             356/519
6,867,868 B1 *   3/2005   Barbarossa .............. G02B 1/06
                                                             356/519
(Continued)

*Primary Examiner* — Jennifer D. Carruth
*Assistant Examiner* — Ryan S. Dunning

(57) ABSTRACT

An optical comb filter, comprising an input/output collimator (50), an output collimator (60), a spectroscope (10), and first, second and third GT resonant cavities (20, 30, 40), wherein each GT resonant cavity comprises a transparent solid block coated with a membrane layer and a spacing part, a through hole is provided on the transparent solid block, and the transparent solid block and the spacing part form a hollow cavity; and rectangular orientation of an insertion loss curve is realized, and the bandwidth utilization rate is high.

10 Claims, 1 Drawing Sheet

(51) Int. Cl.
*G02B 6/293* (2006.01)
*G02B 6/42* (2006.01)
*H04J 14/02* (2006.01)
*G01B 9/02* (2006.01)
*G02B 26/00* (2006.01)

(52) U.S. Cl.
CPC ........... *G02B 6/421* (2013.01); *G02B 6/4215* (2013.01); *H04J 14/02* (2013.01); *G01B 9/02008* (2013.01); *G02B 1/11* (2013.01); *G02B 5/284* (2013.01); *G02B 6/29349* (2013.01); *G02B 6/29361* (2013.01); *G02B 26/001* (2013.01); *G02B 26/004* (2013.01); *G02F 2203/54* (2013.01); *G02F 2203/56* (2013.01)

(58) Field of Classification Search
CPC ............ G02B 6/29349; G02B 6/29358; G02B 6/29361; G02B 6/421; G02B 6/4215; G02B 26/001; G02B 26/004; G02F 2203/54; G02F 2203/56; G02F 2203/58; G02F 2203/585; H04J 14/02–14/022
USPC .......... 359/260, 484.09, 580, 582, 589, 590; 385/24; 398/48, 68, 73, 79, 82, 83, 85
See application file for complete search history.

(56) References Cited

U.S. PATENT DOCUMENTS

| | | | |
|---|---|---|---|
| 6,909,511 B2* | 6/2005 | Copner | G02B 6/29349 356/519 |
| 2004/0080834 A1* | 4/2004 | Thompson | 359/629 |
| 2009/0116851 A1* | 5/2009 | Heffner et al. | 398/208 |

* cited by examiner

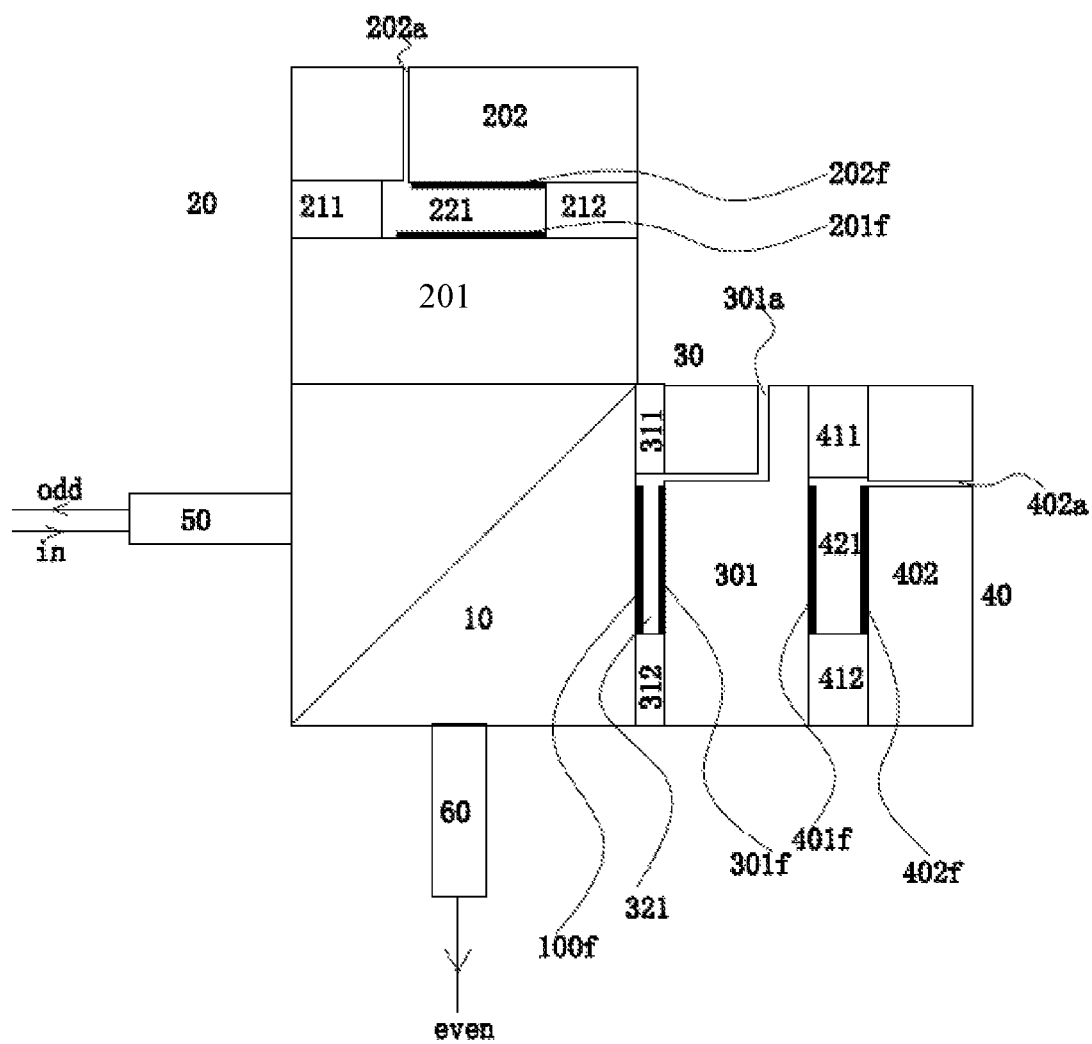

OPTICAL COMB FILTER HAVING FIRST, SECOND AND THIRD GT RESONANT CAVITIES

TECHNICAL FIELD

The present patent application relates to the technical field of optical communication devices, and more specifically, to the improvement to GT cavity interference-type filter used to filter optical signals.

BACKGROUND

With the rapid development of the information communications technology, the exchange of voice, image and data information is increasing. Especially as the result of the widespread application of the Internet, people have higher requirements for broadband communication. In a bid to come up with a low-cost and high-quality system to meet people's requirements for broadband communication in the shortest possible time, the wavelength division multiplexing (WDM) technology is widely used.

Another way of increasing the optical fiber transmission capacity is to further narrow the channel spacing. Currently, the channel spacing are all 100 Hz or 200 Hz, according to the provisions of the International Telecommunication Union (ITU). If people want to conduct low-cost capacity expansion of the original system, they prefer an optical comb filter that realizes the expansion by changing the channel spacing without altering the original equipment and system. The existing optical comb filter divides one-channel multi-wavelength optical signals into two channels, one of which have odd-channels of wavelengths and the other of which have even-channels of wavelengths, and the channel spacing becomes twice the original. Currently, a MGTI-type comb filter is widely used, thanks to its low cost and mature technology. However, the MGTI-type optical comb filter usually adopts a GT cavity structure to realize a flat top, but the channel bandwidth is small, so it sees low bandwidth utilization.

SUMMARY

The present patent application provides an optical comb filter featuring the appearance of the insertion loss curve as a rectangle and high bandwidth utilization.

To achieve the objective above, the present patent application provides an optical comb filter comprising an input/output collimator, an output collimator, a spectroscope, a first GT resonant cavity, a second GT resonant cavity and a third GT resonant cavity. The first GT resonant cavity comprises reflective films-coated transparent solid blocks and spacing parts. The transparent solid block has a through-hole. The transparent solid blocks and the spacing parts form a hollow cavity. The second GT resonant cavity comprises a reflective membrane layer-coated transparent solid block, a reflective membrane layer coated on the surface of the beam splitter and spacing parts. The transparent solid block has a through-hole. The transparent solid block, the beam splitter and the spacing parts form a hollow cavity (221). The third GT resonant cavity comprises a reflective membrane layer-coated transparent solid block, a reflective membrane layer coated on another surface of the transparent solid block and spacing parts. The transparent solid block has a through-hole. The transparent solid blocks and the spacing parts form a hollow cavity.

Optionally, the beam splitter is coated with a membrane layer with a splitting ratio of 50:50.

Optionally, the reflective membrane layer of the first GT cavity is a highly reflective membrane layer, and the reflective membrane layer is a partially reflective membrane layer.

Optionally, both the films of the second GT cavity are antireflection films.

Optionally, the membrane layer of the third GT cavity is a highly reflective membrane layer, and the membrane layer is a partially reflective membrane layer.

Optionally, the input/output collimator is an optical fiber collimator.

Optionally, the output collimator is an optical fiber collimator.

Optionally, the optical path of the hollow cavity included in the third GT cavity and that of the hollow cavity included in the first GT cavity are equal, and both are twice the optical path of the hollow cavity included in the second GT cavity.

Optionally, when a channel spacing is selected as 100 GHz, the optical path of the hollow cavity included in the third GT cavity and that of the hollow cavity included in the first GT cavity are both 3 mm, and the optical path of the hollow cavity of the second GT cavity is 1.5 mm.

The optical comb filter of the present patent application has the following beneficial effects: 1. the transparent solid block and the transparent solid block are of the same material and thickness, which can realize temperature compensation; 2. by supplying and releasing gases to or from the cavities via the through-holes, it can conveniently adjust the pressure in the resonant cavity, to achieve the purpose of adjusting the optical path; 3. the second GT resonant cavity and the third resonant cavity form a composite GT cavity structure, realizing the appearance of the insertion loss curve as a rectangle high bandwidth utilization.

BRIEF DESCRIPTION OF THE DRAWINGS

The structure of the present patent application is further detailed in combination with the drawings and embodiments hereinafter.

The FIGURE is a diagram of the integral structure of the comb filter of the present patent application.

DETAILED DESCRIPTION

The working principle of the low-dispersion optical comb filter is further detailed in combination with the drawings hereinafter.

As shown in FIGURE, the present patent application provides an optical comb filter comprising a beam splitter 10, a first GT resonant cavity 20, a second GT resonant cavity 30, a third GT resonant cavity 40, an input/output collimator 50, an output collimator 60

The beam splitter 10 comprises a substrate of quartz or other optical glasses and a membrane layer coated thereof and with a splitting ratio of 50:50;

The first GT resonant cavity 20 comprises transparent solid blocks 201, 202 and spacing parts 211 and 212 for separating the transparent solid blocks 201 and 202, wherein the transparent solid blocks 201 and 202 and the spacing parts 211 and 212 form a hollow cavity 221.

The transparent solid block 202 has a through-hole 202a. The through-hole 202a connects with the hollow cavity 221 so that gases are supplied or released to or from the hollow cavity 221 via the through-hole 202a to control the gas pressure in the hollow cavity 221.

The transparent solid blocks 201, 202 are both coated with films 201f and 202f on the opposite surfaces. The membrane layer 201f is a partially reflective membrane layer, while the membrane layer 202f is a highly reflective membrane layer. Transparent solid blocks 201, 202, for example, are glass blocks.

The first GT cavity 20 is placed on the side of the beam splitter 10 of which light comes out.

The second GT resonant cavity 30 comprises a transparent solid block 301 and spacing parts 311 and 312 for separating the transparent solid block 301 and the beam splitter 10, wherein the transparent solid block 301 and the spacing parts 311 and 312 form a hollow cavity 321. And the optical path of the hollow cavity 321 is half that of the hollow cavity 221.

The transparent solid block 301 has a through-hole 301a. The through-hole 301a connects with the hollow cavity 321 so that gases are supplied or released to or from the hollow cavity 321 via the through-hole 301a to control the gas pressure in the hollow cavity 321.

The beam splitter 10 and the transparent solid blocks 301 were both coated with films 100f and 301f on the opposite surfaces. The films 100f and 301f are both antireflection films. The transparent solid block 301, for example, is a glass block, and the transparent solid block 301 and the transparent solid block 201 are of the same material and thickness.

The second GT cavity 30 is placed on the side of the beam splitter 10 of which light comes out.

The third GT resonant cavity 40 comprises transparent solid blocks 301, 402 and spacing parts 411 and 412 for separating transparent solid blocks 301 and 402, wherein the transparent solid blocks 301 and 402 and the spacing parts 411 and 412 form a hollow cavity 421. The optical path of the hollow cavity 421 and that of the hollow cavity 221 are equal, that is, both are twice the optical path of the hollow cavity 312.

The transparent solid block 402 has a through-hole 402a. The through-hole 402a connects with the hollow cavity 421 so that gases are supplied or released to or from the hollow cavity 421 via the through-hole 402a to control the gas pressure in the hollow cavity 421.

The transparent solid blocks 301, 402 were both coated with films 401f and 402f on the opposite surfaces. The membrane layer 401f is a partially reflective membrane layer, while the membrane layer 402f is a highly reflective membrane layer. The transparent solid block 301 and the transparent solid block 301 in the second GT cavity 30 is the same transparent solid block. The transparent solid block 402, for example, is a glass block.

The third GT cavity 40 is placed at the back of the second GT cavity 30.

Arranged on one side of the the beam splitter 10, the input/output collimator 50 is used to collimate optical signals inputted in the optical path and then input them into the beam splitter 10, or to collimate optical signals reflected back from the beam splitter 10 and then output optical signals with odd channels of wave lengths. The input/output collimator 50 is an optical fiber collimator.

Arranged on the other side of the beam splitter 10, the output collimator 60 is used to collimate optical signals output from the optical path and output optical signals with even channels of wavelengths. The output collimator 60 is a fiber collimator.

When the channel spacing is selected as 100 GHz, the optical path of the hollow cavity 421 included in the third GT cavity 40 and that of the hollow cavity 221 included in the first GT cavity 20 may be both selected as 3 mm, and the optical path of the hollow cavity 312 of the second GT cavity 30 may be selected as 1.5 mm.

The optical comb filter of the present patent application has the following beneficial effects: 1. the transparent solid block 201 and the transparent solid block 301 are of the same material and thickness, which can realize temperature compensation; 2. by supplying and releasing gases to or from the cavities 221, 321, 421 via the through-holes 201a, 301a, 402a, it can conveniently adjust the pressure in the resonant cavity, to achieve the purpose of adjusting the optical path; 3. the second GT resonant cavity 30 and the third resonant cavity 40 form a composite GT cavity structure, realizing the appearance of the insertion loss curve as a rectangle and high bandwidth utilization.

The foregoing is only the best embodiment of the present patent application and not intended to limit the scope of the present patent application. Any equivalent changes or modifications made based on the patent scope of the present patent application are all covered by the present patent application.

What is claimed is:
1. An optical comb filter comprising:
an input/output collimator (50),
an output collimator (60),
a beam splitter (10),
a first GT resonant cavity (20),
a second GT resonant cavity (30), and
a third GT resonant cavity (40),
wherein the GT resonant cavity (20) comprises transparent solid blocks (201, 202) coated with a first reflective membrane layer (201f) and a second reflective membrane layer (202f) and spacing parts (211, 212), wherein the transparent solid block (202) has a through-hole (202a), the transparent solid blocks (201, 202) and the spacing parts (211, 212) form a hollow cavity (221), and the through-hole (202a) included in the first GT resonant cavity (20) connects with the hollow cavity (221) included in the first GT resonant cavity (20); the second GT resonant cavity (30) comprises a membrane layer transparent solid block (301) coated with a membrane layer (3010f), an antireflection membrane layer (100f) and spacing parts (311, 312) coated on a surface of the beam splitter (10), wherein a through-hole (301a) is set on the transparent solid block (301), the transparent solid block (301), the beam splitter (10) and the spacing parts (311, 312) form a hollow cavity (321), and the through-hole (301a) included in the second GT resonant cavity (30) connects with the hollow cavity (321) included in the second GT resonant cavity (30); the third GT resonant cavity (40) comprises a transparent solid block (402) coated with a reflective membrane layer (402f), reflective membrane layer (401f) coated on another surface of the transparent solid block (301) and spacing parts (411, 412), wherein a through-hole (402a) is set on the transparent solid block (402), and the transparent solid blocks (301, 402) and the spacing parts (411, 412) form a hollow cavity (421), and the through-hole (402a) included in the third GT resonant cavity (40) connects with the hollow cavity (421) included in the third GT resonant cavity (40);
wherein the transparent solid block (201) included in the first GT cavity (20) and the transparent solid block (301) included in the second GT resonant cavity (30)

are of a same material and a same thickness in their respective optical path directions to realize temperature compensation;

gases are supplied and released to or from the hollow cavity (221) included in the first GT resonant cavity (20), the hollow cavity (321) included in the second GT resonant cavity (30) and the hollow cavity (421) included in the third GT resonant cavity (40) via the through-hole (202a) included in the first GT resonant cavity (20), the through-hole (301a) included in the second GT resonant cavity (30), and the through-hole (402a) included in the third GT resonant cavity (40) to adjust pressure in the first GT resonant cavity (20), the second GT resonant cavity (30) and the third GT resonant cavity (40);

the second GT resonant cavity (30) and the third resonant cavity (40) form a composite GT cavity structure to realize appearance of an insertion loss curve as a rectangle.

2. The optical comb filter as claimed in claim 1, wherein the second reflective membrane layer (202f) of the first GT cavity (20) is a highly reflective membrane layer, and the first reflective membrane layer (201f) is a partially reflective membrane layer.

3. The optical comb filter as claimed in claim 2, wherein the antireflection membrane layer (100f) and the membrane layer (301f) of the second GT cavity (30) are both antireflection membrane layer.

4. The optical comb filter as claimed in claim 3, wherein the reflective membrane layer (402f) of the third GT cavity (40) is a highly reflective membrane layer, and the reflective membrane layer (401f) of the third GT cavity (40) is a partially reflective membrane layer.

5. The optical comb filter as claimed in claim 1, wherein the beam splitter is coated with a membrane layer with a splitting ratio of 50:50.

6. The optical comb filter as claimed in claim 1, wherein the input/output collimator is a fiber collimator.

7. The optical comb filter as claimed in claim 6, wherein the output collimator is a fiber collimator.

8. The optical comb filter as claimed in claim 1, wherein a length of an optical path of the hollow cavity (421) included in the third GT cavity (40) and a length of an optical path of the hollow cavity (221) included in the first GT cavity (20) are equal, and both of the lengths of the optical paths are twice of a length of an optical path of the hollow cavity (312) included in the second GT cavity (30).

9. The optical comb filter as claimed in claim 8, wherein when a channel spacing is selected as 100 GHz, the length of the optical path of the hollow cavity (421) included in the third GT cavity (40) and the length of the optical path of the hollow cavity (221) included in the first GT cavity (20) are both 3 mm, and the length of the optical path of the hollow cavity (312) of the second GT cavity (30) is 1.5 mm.

10. The optical comb filter as claimed in claim 1, wherein the through-hole (202a) included in the first GT resonant cavity (20) is perpendicular to the hollow cavity (221) included in the first GT resonant cavity (20); a first portion of the through-hole (301a) included in the second GT resonant cavity (30) is perpendicular to the hollow cavity (321) included in the second GT resonant cavity (30); a second portion of the through-hole (301a) included in the second GT resonant cavity (30) is perpendicular to the first portion of the through-hole (301a) included in the second GT resonant cavity (30); and the through-hole (402a) included in the third GT resonant cavity (40) is perpendicular to the hollow cavity (421) included in the third GT resonant cavity (40).

\* \* \* \* \*